UNITED STATES PATENT OFFICE.

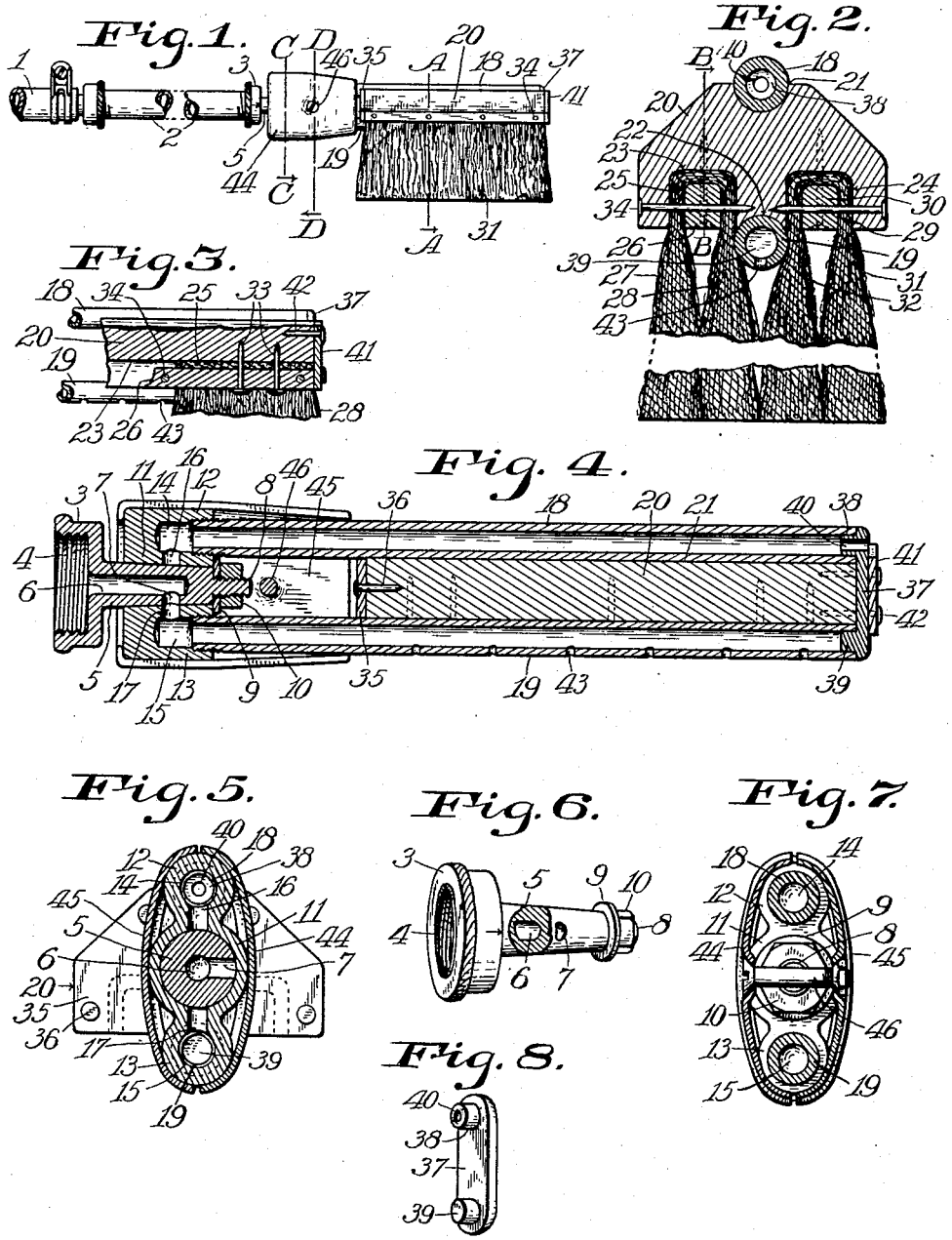

GEORGE W. HAHN, OF INDIANAPOLIS, INDIANA.

DUSTER, SCRUBBER, AND WASHER APPLIANCE.

1,219,296.  Specification of Letters Patent.  Patented Mar. 13, 1917.

Application filed January 21, 1916.  Serial No. 73,271.

*To all whom it may concern:*

Be it known that I, GEORGE W. HAHN, a citizen of the United States, residing at Indianapolis, in the county of Marion and State of Indiana, have invented a new and useful Duster, Scrubber, and Washer Appliance, of which the following is a specification, reference being had to the accompanying drawings and to the letters and figures of reference marked thereon.

This invention relates to a combined duster, scrubber and washer for cleaning vehicles, buildings, or machines, the invention having reference more particularly to a fountain brush provided with a jet nozzle for rinsing or washing the work with flowing water after having removed the dust or mud from the surface requiring cleansing.

An object of the invention is to provide a convenient implement or appliance to be used in connection with a water-hose and be adaptable for either dusting or scrubbing purposes in order to avoid the loss of time and trouble incidental to the use of several devices in cleansing operations.

Another object is to provide a combination implement or appliance of the above-mentioned character that shall be so constructed as to be adapted to be quickly changed to perform the different functions thereof, and which shall be so constructed as to be capable of being used for dusting purposes independently of the water-hose.

A further object is to provide a superior scrubber and washer which may be cheaply produced and inexpensively repaired and be efficient, durable and economical in use.

With the above-mentioned and other objects in view, the invention consists in a novel valve-equipped head provided with a removable brush and a conduit for conducting water from the head to the brush, and preferably an independent conduit for delivering water beyond the brush as a jet or spray; the invention consisting also further in the novel parts, and combinations and arrangements of parts, as hereinafter particularly described and further defined in the accompanying claims.

Referring to the drawings, Figure 1 is a side elevation of the novel implement which is connected to an extension handle and a hose adapted for conducting water to the implement; Fig. 2 is a transverse section on the line A A on Fig. 1; Fig. 3 is a fragmentary section on the line B B on Fig. 2; Fig. 4 is a longitudinal vertical section centrally of the implement; Fig. 5 is a transverse section approximately on the line C C on Fig. 1; Fig. 6 is a perspective view of one of the parts of the valve-equipped head of the implement; Fig. 7 is a transverse section on the line D D on Fig. 1; and, Fig. 8 is a perspective view of one of the parts of the implement.

Similar reference characters on the different figures of the drawings indicate corresponding elements or features of construction herein referred to.

On the drawings the numeral 1 indicates a flexible hose for conducting water, and 2 a pipe connected to the hose to constitute a hollow pole or extension handle for the implement and through which the water may be conducted for the purposes required.

The implement comprises a cup-shaped coupling member 3 having screw-threads 4 in its front portion whereby to couple the member either to an extension handle or to a water hose as may be preferred. The coupling member has a tapering plug valve 5 on its rear or opposite side into which a longitudinal duct 6 extends from the screw-threaded front portion, the wall of the valve having also a transverse duct 7 extending from the longitudinal duct to the surface of the valve. The end of the valve has a screw-threaded stud 8 thereon on which is placed a washer 9 and a nut 10. A head is provided which comprises a body portion 11 having wings 12 and 13 thereon which have chambers 14 and 15 therein respectively, the body portion having ports 16 and 17 in opposite portions thereof that extend from the chambers respectively to the external surface of the valve 5 which is rotatably fitted into a suitable bore in the body portion 11, so that either the valve may rotate in the head or the head rotate on the valve, the valve being retained in proper position by means of the washer and the nut, the washer being in frictional contact with the inner end of the body portion. The valve may be turned so as to bring the duct 7 either to the port 16 or to the port 17, or to a position between the ports so as to close both ports. Two tubes 18 and 19 are provided which are equal in length, one end of one of the tubes being secured to the wing 12 so as to form communication with the chamber 14, one end of the other tube being connected to the wing 13 so as to have communication with the chamber 15. The tubes project in parallel arrangement from the rear or inner end of the head and a suitable brush back 20 is secured between them. A suitable brush is provided and may vary in width as may be desired, the back 20 thereof being shown as a simple wooden back but which may be variously constructed of other material. The top of the brush back has a longitudinal groove 21 therein in which the tube 18 extends, and the under side or bottom of the back 20 has a groove 22 therein along which the tube 19 extends to prevent the brush back from turning from its proper position relatively to the tubes which practically constitute water-conducting frame members for the brush.

In the present case the under side or bottom of the brush back 20 has two longitudinal channels 23 and 24 therein and four rows of bristles are contemplated. The bristles or fibers to form the brush are placed with their middle portions transversely of the channel in a layer and pressed in to form loops 25 in one channel, forming a lining in the channel, a bar 26 being forced into the loops in the channel so that two rows of brush bristles or fibers 27 and 28 are formed. In the other channel a layer is similarly placed and pressed in to form loops 29 in which is forced a bar 30 so that two more rows 31 and 32 are formed, thus making a relatively broad brush. The bars are suitably secured in place, as by means of brads 33 and 34. It will be understood that in some cases the brush may have only two rows of bristles or fibers. A cover 35 is secured to one end of the brush back, preferably by means of brads 36, and may be composed of leather so as to close adjacent ends of the channels, the adjacent end of the back being a suitable distance from the valve-equipped head. A tie bar 37 is provided which is let into a suitable recess in the opposite end of the back 20 in vertical arrangement and it has two plugs 38 and 39 thereon that are inserted in and secured to the ends of the tubes 18 and 19 respectively, the plug 38 having a bore 40 therein to constitute a jet nozzle for the tube 18. The adjacent end of the brush back has a cover 41 secured thereto, preferably by means of brads 42, and preferably is composed of leather so as to prevent the brush back from marring varnished or painted surfaces when in use. The normal under side of the tube 19 has a suitable number of small apertures 43 therein to permit the escape of water from the tube to the brush. The implement is provided with a handle which comprises two suitably shaped plates 44 and 45 embracing the opposite side portions respectively of the valve-equipped head and the adjacent tubes 18 and 19, the plates extending approximately to the brush back 20 and are secured together and to the implement parts by means of a bolt 46.

It should be understood that the bar 37 and the plugs 38 and 39 may be so secured in place as to permit them to be detached and removed in order that the brush back may be removed when the brush is worn out to be replaced by a new brush. Also the brush may be variously constructed and of such material as may be desired.

In practical use the implement may be carried in the hand and used wherever needed as a dusting brush without the use of water, and obviously may be similarly used when connected to a water-supplying conduit, the relative position of the valve corresponding to that shown in Fig. 5 when the water is not desired to be used. When the water is required for moistening the dust or mud, as may be found necessary when cleaning the running-gear of automobiles or other vehicles, the valve or the head thereon is turned so as to open communication between the duct 6 and the chamber 15 through the duct 7 and the port 17, so that the tube 19 is supplied with water which is discharged through the apertures 43 into the brush. After the mud is moistened and scrubbed loose from the surfaces the valve or the head is re-adjusted to bring the chamber 14 into communication with the duct 6 through the duct 7 and the port 16, in order to supply the tube 18 with water which is discharged from the jet nozzle at its end to rinse the loosened dirt from the surface. The water from the jet nozzle obviously may be used for various purposes, and more particularly for rinsing dust from the vehicle body when scrubbing is not required. It will be obvious also that the implement is suitable for use for house cleaning purposes as well as for cleaning vehicles.

Having thus described the invention, what is claimed as new is—

1. A scrubber appliance including a brush back having a longitudinal groove in its under side and a longitudinal groove in its upper side, a head having two frame bars fixed thereto that extend along the grooves, one in each groove, and secured to the brush back, the bar in the under groove being hollow and having apertures in its wall, a valve in the head to admit liquid to the hollow bar, and bristle-like material secured to the brush back.

2. A scrubber and washer appliance including a brush back having a longitudinal groove in its under side and a longitudinal groove in its upper side, a head having two frame bars fixed thereto that extend along the grooves, one in each groove, and secured to the brush back, the bar in the upper groove being hollow and having a jet nozzle on its end, bristle-like material secured to the brush back, and a valve in the head to admit liquid to the hollow bar.

3. A duster, scrubber and washer appliance including a head having two chambers therein, the head being bored and having two ports extending from the chambers respectively to the bore of the head, a valve rotatable in the bore of the head and having a longitudinal duct and a continuing transverse duct to conduct liquid to either one of the ports, two tubes secured to the head in connection with the respective chambers, one of the tubes having a jet nozzle on its end, the remaining tube having a closed end and having apertures in its wall, and a brush having its back inserted between the two tubes and secured thereto.

4. In a duster, scrubber and washer appliance, the combination with a valve-equipped head, of two conduits connected to the head to receive water therefrom, one of the conduits having a jet nozzle on its end, the remaining one of the conduits having apertures in its wall, a brush back inserted between the two conduits and having grooves receiving the adjacent sides of the conduits, means securing the back to the conduits, and bristle-like material secured to the brush back.

5. In a duster, scrubber and washer appliance, the combination of a head having a longitudinal bore and also two wings on two opposite sides respectively of the head, each wing having a chamber therein, the head having two ports therein extending from the bore and also to the chambers respectively, two tubes secured to the two wings in connection with the chambers respectively, one of the tubes having a plug in its end and also apertures in the wall of the tube, the remaining tube having an apertured plug in its end, a brush back between the two tubes, bristle-like material secured to the brush back and projecting therefrom adjacent to the apertured tube, a valve rotatable in the bore of the head and having a duct therein extending to the bore to open either one of said ports, the valve being adapted to close both the ports, said valve having a cup-shaped outer member provided therein with screw threads, two handle plates covering said head and its wings and also portions of said tubes adjacent to said brush back, and a bolt connected to said plates and securing them in place.

In testimony whereof, I affix my signature in presence of two witnesses.

GEORGE W. HAHN.

Witnesses:
E. T. SILVIUS,
M. E. SPARROW.

Copies of this patent may be obtained for five cents each, by addressing the "Commissioner of Patents, Washington, D. C."